Patented Apr. 1, 1930

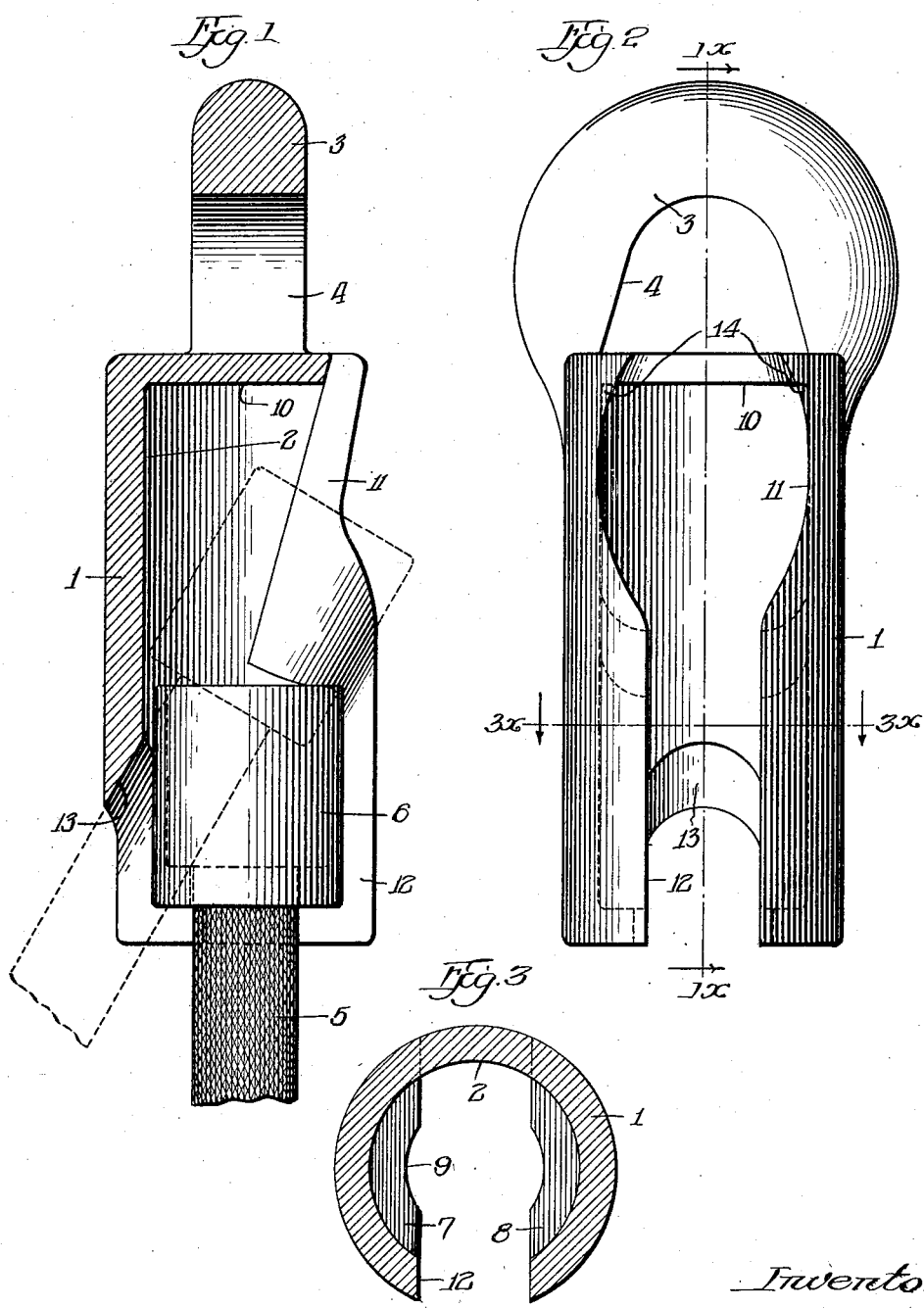

1,752,367

UNITED STATES PATENT OFFICE

WILLIAM CHARLTON BRUTON, OF ALBANY, CALIFORNIA, ASSIGNOR TO AMERICAN MANGANESE STEEL COMPANY, OF CHICAGO, ILLINOIS, A CORPORATION OF MAINE

CHOKER HOOK

Application filed April 13, 1929. Serial No. 354,749.

This invention relates to logging hooks for connecting thereto the end of cable lines. It is customary in the logging industry to use wire cable lines which pass around the logs to be hauled and have at the ends of the cable lines enlargements or ferrules adapted to be connected to choker hooks or butt hooks comprising generally a body construction having a socket and a key-hole slot for receiving the cable ferrule or enlargement and retaining it in place. These hooks are subjected to severe conditions in use and must be so designed as to prevent the accidental disengagement of the cable line.

It is the purpose of this invention to provide a hook of an improved design whereby the connections of the cable to the hooks may be easily and readily made. One of the objections to the hooks at present in use in which there is an endwise axial admission of the cable enlargement, is that they require a substantial amount of slack in the cable line.

One of the features of this invention is that the cable may be connected to the hook by a substantially sidewise movement followed by an angular pull to seat the cable enlargement within the socketed portion of the hook.

It is further an object of this invention to provide a hook of simple design having substantially smooth sides free from catching projections and which will prevent the accidental disengagement of the cable end due to an end thrust upon the cable.

Further objects and advantages will be clearly apparent as the invention is more fully described.

In the drawings a preferred form is illustrated in which—

Figure 1 is a sectional elevation on line 1—1 of Figure 2 showing the cable and cable enlargement seated in position, and, in dotted lines, the cable end in the act of being inserted.

Figure 2 is a front elevation of a butt end hook showing the receiving slot.

Figure 3 is a horizontal section on line 3—3 of Figure 2 looking downward.

The drawings show one form of adapting the improved construction to a butt end hook but it will be clearly apparent that a similar construction could be embodied in a choker hook. The words "upper", "lower", "forward", etc., as used in the following specification and claims to more clearly describe the construction refer to the position of the hook as shown in Figure 2, but these words should not be construed as limitations since the hooks may be used in any position.

The butt end hook shown comprises a cylindrical body 1 forming an internal chambered socket 2 adapted to axially receive and permit a small amount of endwise movement of the cable enlargement 6. At the upper end of the cylindrical body there is an end connection 3 having an opening 4. There is shown a cable 5 having an enlargement or ferrule 6 upon its end. The ferrule 6, as shown, is of the standard cylindrical shape in which the length of the cylinder is greater than the diameter, but it will be apparent that the length of the cylinder could be shorter than the diameter, if so desired, or the ferrule might be made in other than a cylindrical shape and still be applicable to a hook of the type to be described.

Figure 1 shows the cable enlargement seated within the socket portion 2 and it will be seen that the pull upon the cable is directed along the longitudinal axis of the cylindrical body portion 1. The pull upon the cable 5 seats the cable enlargement 6 against a seat comprising sides 7 and 8, as clearly shown in Figure 3. There is an axial opening 9 between the sides 7 and 8 for the passage of the cable 5. The internal socketed portion 2 is closed at its upper end 10 thus preventing disengagement of the cable end 6 due to an endwise thrust on the cable 5.

The cylindrical body 1 is so designed that the cable enlargement 6 may be entered into the receiving socket 2. To permit this entrance there is an opening 11 on the forward side of the body 1, as shown in Figure 2, directed angularly downward and sufficient in size to permit the passage of the cable enlargement 6. The cable enlargement 6 may only enter this opening 11 by movement along its own axis but angularly to the axis of the cylindrical body 1. The opening 11 will not permit the sidewise admission of the cable enlargement 6 in a vertical position or in a position in which its axis is parallel to the axis of the hook member, since the curved sides of the angular opening 11 inwardly converge above and below the widest portion of the opening 11 and prevent the lateral passage of a straight cylindrical body. The curved corners are designated at 14 in Figure 2.

Extending downward from opening 11 and between the sides 7 and 8 of the seat is a slot 12 sufficient in size to pass the cable 5. The slot 12 terminates in an opening 13 at the lower end and on the opposite side of the cylindrical body 1, the axis of which opening 13 is on a line with the upper angular opening 11.

In the preferred form of construction, the angle between the longitudinal axis of the body 1 and the axis of the angular opening is substantially thirty degrees, but it is clearly apparent that other relative angles may be used.

The manner of connecting the cable to the hook is as follows: The cable portion is passed through the receiving slot 12 until it abuts against the side of the opening 13 and is in line with the upper angular opening 11, then by a pull on the cable, the enlargement 6 will partially enter the socket portion 2. By a further pull on the cable together with a turning movement towards the axis of the body portion 1, the cable enlargement 6 will be seated on the side members 7 and 8 and the pull on the cable 5 will be along the longitudinal axis of the body 1. It is clearly apparent that this side admission with only a small angle of turn required does not need as large amount of slack as an endwise axial admission of the cable enlargement and the connection is therefore much more easily made. Furthermore, the cable enlargement 6 is free to have a short movement inside the cylindrical body portion 1 thereby preventing a kinking of the cable 5, which may occur if the cable enlargement 6 is too tightly held in the event of an endwise thrust upon the cable. The cable enlargement will move until it strikes the upward end 10 of the cylindrical body portion. The cable enlargement 6 cannot then pass transversely through the opening 11 for the reasons previously stated. The end thrusts and pulls upon the cable 5 will not be likely to move the cable 5 to the particular position required to allow the cable enlargement 6 to pass out of the body portion 1 so that accidental disengagement will not occur.

A preferred embodiment has been described but many modifications not departing from the spirit of the invention will be readily apparent.

I claim:

1. In combination, a cable having an enlargement upon one end, a logging hook adapted to receive and seat the cable enlargement so that the pull on the cable is along the longitudinal axis of the hook, said hook comprising a body having an interior socket adapted to receive the cable enlargement, said socket being closed at its upper end but having a slotted opening in its lower end for the passage of the cable, said body having an angular opening for the axial admission of the cable followed by the cable enlargement, said body having another angular opening in the opposite side of the body and in line with the first mentioned angular opening adapted to permit the passage of the cable, said body having a connecting slot from the first mentioned angular opening to the slotted opening in the lower end of the body and connecting the second mentioned angular opening to the slotted portion in the end of the body.

2. In combination, a cable having a cylindrical enlargement upon one end, a logging hook adapted to receive and seat the cable enlargement so that the pull on the cable is along the longitudinal axis of the hook, said hook comprising a body having an interior cylindrical socket adapted to receive the cable enlargement, said socket being closed at its upper end but having a slotted opening in its lower end for the passage of the cable, said body having an angular opening for the axial admission of the cable followed by the cable enlargement, said body having a second angular opening in the opposite side of the body in line with the first mentioned angular opening adapted to permit passage for the cable, said body having a slot connecting the two angular openings with the slotted opening in the end of the body.

3. A logging hook comprising a unitary body having an interior socket for the reception of a cable enlargement, a divided seat at the lower end of the interior socket, said divided seat having a central opening for the reception of the cable, said body having an angular opening at its upper end adapted to permit the entrance of the cable enlargements, said body having a slot extending downward from the angular opening across the seat portion forming the division of the seat and ending in a lower angular opening for the reception of the cable in line with the upper angular opening.

4. In combination, a cable having an enlargement upon its end, a logging hook comprising a body having an internal chambered socket permitting free endwise movement of the cable enlargement between a closed upper end of the body and a seat in the lower end of the body, said seat in the lower end of the body having an opening for the passage of the cable, said body having an angular opening in one side of the body at its upper end directed downward, a slot adapted to permit the passage of the cable extending downward from the angular opening to the seat and extending past the seat portion to an opening in line with the upper angular opening, said lower angular opening adapted to receive the cable.

5. In combination, a cable having an enlargement upon one end, a butt end hook having at its upper end a connection opening, said hook comprising a substantially cylindrical body portion closed at its upper end and open at its lower end, a slot extending through one side of the body portion and terminating in an angular opening at the lower end at the opposite side of the body portion, an angular opening at the upper end of the slot in line with the lower angular opening substantially equal in diameter to the cable enlargement whereby the cable may be passed through the slot until it is in line with the angular openings and then pulled to seat the cable enlargement in the interior of the body with the cable in line with the longitudinal axis of the body portion.

6. In combination, a cable having a cylindrical enlargement upon one end and a hook adapted to receive said enlargement, said hook comprising a unitary body having an internal cylindrical socket, said socket having in a side wall thereof a single aperture sufficient in size to axially pass said cable enlargement, the top of said socket being closed, the bottom of said socket having a central opening adapted to receive said cable, said body having a connecting slot to pass said cable from said aperture to said central opening and the walls of said socket being designed to prevent movement of said cable enlargement in any but an axial direction except when passing through said aperture.

7. In combination, a cable having a cylindrical enlargement upon one end thereof and a hook adapted to receive said enlargement, said hook comprising a unitary body having a cylindrical internal socket, said body having a circular entrance aperture sufficient in size to axially pass said cable enlargement and angularly disposed relative to the axis of said socket, the top of said socket being closed, the bottom of said socket having a central opening to receive said cable when said cable enlargement is in seating position within said socket and said body having a connecting slot adapted to pass said cable from said angular opening to said bottom opening.

8. In combination, a cable having a cylindrical enlargement upon one end thereof and a hook adapted to engage said cable enlargement, said hook comprising a unitary body having an internal cylindrical socket, said body having a circular entrance aperture disposed on an axis at an angle to the axis of said socket to permit the endwise axial admission of said cable enlargement, said socket having walls formed by said body to permit a limited endwise movement of said cable enlargement axial of said socket but preventing angular movement thereof except through said entrance aperture and said body having a slot to permit the passage of said cable from said entrance aperture to a position axial of said socket.

Signed at Albany, California, this 2nd day of April, 1929.

WM. CHARLTON BRUTON.